United States Patent Office 3,301,700
Patented Jan. 31, 1967

3,301,700
COMPOSITE WITH COPOLYMER COATING BONDED TO A POLYMERIC SUBSTRATE THROUGH ACID HALIDE UNITS
Daniel Edwin Maloney, Wilmington, Del., assignor to E. I. du Pont de Nemours and Company, Wilmington, Del., a corporation of Delaware
No Drawing. Filed Jan. 29, 1965, Ser. No. 429,148
3 Claims. (Cl. 117—118)

This application is a continuation-in-part of application Serial No. 254,592, filed January 29, 1963.

This invention relates to processes of treating polymeric materials to modify their properties, and to the composite products so produced. More particularly, this invention relates to the process of treating polymeric materials containing groups having the formula

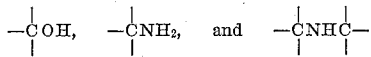

with copolymers having units having the general formula $$-CH_2-\underset{\underset{R'}{|}}{\overset{\overset{R_2}{|}}{C}}-$$

where R' is a radical selected from the class consisting of hydrogen, halogen, and hydrocarbon radicals having 1 to 8 carbon atoms and $R_2$ is a radical selected from the class consisting of hydrogen, halogen, and methyl, and acyl halide units having 3 to 8 carbon atoms, said units containing the radical

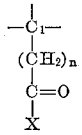

where $C_1$ is a carbon atom in the main polymer chain, $n$ is 0 to 5, and X is halogen. (Processes for the production of such copolymers are described in United States patent application Serial No. 254,567, filed January 29, 1963.) The treating of the polymeric material with the copolymer results in the formation of covalent links between them in that some of the acyl halide groups react with the

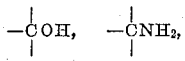

and/or

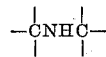

groups resulting in the formation of ester or amide linkages according to the following general equation:

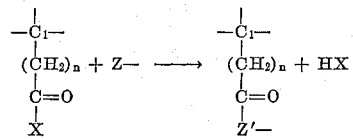

where $C_1$, X, and $n$ are as previously defined and Z— is a radical selected from the class consisting of

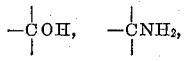

and

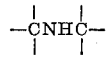

and Z' is a Z radical that has reacted and contains one less hydrogen atom, i.e.

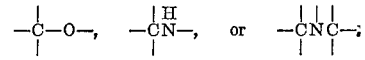

The O or N of Z' is covalently bonded to the carbon atom of the copolymer. The resulting product is then further reacted through some of the remaining acyl halide radicals with at least one modifying compound containing at least one group reactive with alkanoic acid halides, resulting in radicals having the formula

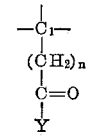

where Y is an organic radical.

The polymeric material to which the copolymer is attached may be either a natural or synthetic polymer that contains per molecule at least one reactive group selected from the class consisting of

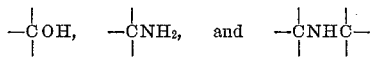

Thus, it is apparent that the polymeric material contains alcoholic hydroxyl groups, primary and secondary amine groups and amide groups. A relatively large class of materials containing these functional groups are the naturally occurring polymeric materials, particularly glucose polymers and alpha amine acid polymers. Thus, the polymeric materials useful in the present invention include cellulose, regenerated cellulose, cellulose esters, and otherwise modified cellulose, protenaceous polymers such as wool, and other types of hair, leather and silk as well as synthetic polymers containing the functional groups; such synthetic polymers include the polyamides, and the polyesters such as those obtained from the reaction of methyl terephthalate and ethylene glycol. The polymeric material may be in the form of fibers, films, textiles, or other shapes. The number of groups on the polymeric material capable of reacting with an acyl halide group may be as low as one per molecule, but preferably should be within the range of $5 \times 10^{-5}$ to 0.03, per gram of polymeric material.

The copolymers employed in the present invention for reaction with the polymeric material are preferably of high molecular weight. The melt index of the alpha-olefin copolymers is within the range of 0.1 to 1000 g./10 minutes and preferably within the range of 1.0 to 200 g./10 minutes as measured by ASTM D-1238-57T. The copolymers must contain at least 50 mole percent units having the formula $$-CH_2-\underset{\underset{R_2}{|}}{\overset{\overset{R'}{|}}{C}}-$$

where R' is a radical selected from the class consisting of hydrogen, halogen and hydrocarbon radicals having 1 to 8 carbon atoms, and $R_2$ is a radical selected from the class consisting of hydrogen, halide, and methyl; preferably at least 80 mole percent of the units are of this type. Specific units useful in the copolymers are those derived on polymerization of ethylene, propylene, butene-1, styrene, pentene-1, hexene-1, heptene-1, 3 methylbutene-1, 4 methylpentene-1, butadiene, vinyl halide, and vinylidene halide. The copolymers must contain between .1 and 25 mole percent acid halide units, preferably .2 to 10 mole percent. The halogen is preferably chlorine, but it may also be bromine, iodine or fluorine. These units are derived from the polymerization of alpha, beta ethylenically unsaturated carboxylic acids having 3 to 8 carbon atoms followed by reaction with a halogenating agent to convert the acid group to the acyl halide. Specific acids that are useful in the copolymers include acrylic, methacrylic, ethacrylic, itaconic, maleic, fumaric, monoesters of dicarboxylic acid, such as ethyl hydrogen fumarate and maleic anhydride.

The preferred process for preparing the copolymers for use in the process of the present invention is direct copolymerization. This may be achieved by introducing the monomers into a polymerization environment maintained at high pressures, 50 to 3000 atmospheres, and at elevated temperature, 150 to 300° C., together with a free radical polymerization catalyst. An inert solvent such as water or benzene may be employed in the polymerization environment. Random distribution of carboxylic acid groups in all the polymer molecules is best obtained by direct copolymerization. Particular processes for the production of the copolymers are known in the art and described in the literature.

The acyl halide copolymer need not necessarily comprise a two component polymer. More than one monomer having the formula $$CH_2=\underset{R_2}{\overset{R'}{\underset{|}{\overset{|}{C}}}}$$

may be employed, and more than one alpha, beta ethylenically unsaturated acid halide may be employed. Additionally, other inert copolymerizable monomer can be employed in the copolymer. The term "inert" is used to define monomers which do not react with the acid halide. The scope of copolymers suitable for conversion to acyl halide copolymers is illustrated by the following examples:

Ethylene/acrylic acid copolymers,
ethylene/methacrylic acid copolymers,
ethylene/itaconic acid copolymers,
ethylene/methyl hydrogen maleate copolymers,
ethylene/maleic acid copolymers,
ethylene/acrylic acid/methyl methacrylate copolymers,
ethylene/methacrylic acid/ethyl acrylate copolymers,
ethylene/itaconic acid/methyl methacrylate copolymers,
ethylene/methyl hydrogen maleate/ethyl acrylate copolymers,
ethylene/methacrylic acid/vinyl acetate copolymers,
ethylene/acrylic acid vinyl formate copolymers,
ethylene/propylene/acrylic acid copolymers,
ethylene/styrene/acrylic acid copolymers,
ethylene/methacrylic acid/acrylonitrile copolymers,
ethylene/fumaric acid/vinyl methyl ether copolymers,
ethylene/vinyl chloride/acrylic acid copolymers,
ethylene/vinylidene chloride/acrylic acid copolymers,
ethylene/vinyl fluoride/methacrylic acid copolymers,
ethylene/chlorotrifluoroethylene/methacrylic acid copolymers,
polyethylene/acrylic acid graft copolymers,
polyethylene/methacrylic acid graft copolymers,
polymerized ethylene/propylene acrylic acid graft copolymers
polymerized ethylene/butene-1 methacrylic acid graft copolymers,
polymerized ethylene/vinyl acetate methacrylic acid graft copolymers,
polypropylene/acrylic acid graft copolymers,
polypropylene/methacrylic acid graft copolymers,
polybutene/acrylic acid graft copolymers,
poly-3-methylbutene/acrylic acid graft copolymers,
polyethylene/acrylic acid/ethyl acrylate graft copolymers,
vinyl chloride/methacrylic acid copolymers, and
vinylidene chloride/methacrylic acid copolymers.

A suitable process for the formation of the acyl halide group is the formation of a slurry of acid copolymer in a halogenated solvent such as carbon tetrachloride to which is added a halogenating agent such as phosphorus pentachloride. After heating with agitation, nearly 100% conversion can be obtained. This process is more fully described in United States patent application Serial No. 254,567.

The modifying organic compound that is reacted with the copolymer after the application of the copolymer to the polymeric material contains at least one atom that is reactive with an alkanoic acid halide such as acetyl chloride. The modifying compound may thus contain a reactive hydrogen or an alkali metal ion in the form of a salt of an acid of the organic compound. Compounds that contain a reactive hydrogen include those containing aromatic hydrogen that may be reacted in the presence of a Friedel-Crafts catalyst as well as the more reactive hydrogen atom containing molecules such as molecules containing alcoholic hydroxyl groups, primary amines, unsubstituted amido groups, secondary amino, N-alkyl substituted amido, imino groups, enolizable carbon hydrogen groups, mercapto groups, thiocarboxylic acid groups and phosphino groups.

Table I illustrates the type of compounds which react with the acyl halide containing copolymers after their application to the polymeric material.

TABLE I

| Reactive Group | Compound | Polymeric Unit | Utility |
|---|---|---|---|
| —NH₂ primary amine, amide groups. | (1)  2(o-Aminophenyl)benzotriazole. | 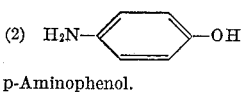 | Ultraviolet Screen. |
| | (2) H₂N—⟨ ⟩—OH  p-Aminophenol. | $CH_3-\underset{|}{\overset{CH_2}{C}}-\overset{O}{\overset{\|}{C}}-NH-\langle\ \rangle-OH$ | Ultraviolet Screen. |
| | (3) H₂N—CH₂—CH₂—CH₂—N(CH₂—CH₂)₂O  N-aminopropylmorpholine. | $CH_3-\underset{\underset{CH_2}{|}}{\overset{CH_2}{\underset{|}{C}}}-\overset{O}{\overset{\|}{C}}-NH(CH_2)_3N(CH_2-CH_2)_2O$ | Antistatic Agent. |

TABLE I—Continued

| Reactive Group | Compound | Polymeric Unit | Utility |
|---|---|---|---|
| | (4) $H_2NCH_2CH_2OH$<br>Ethanol amine. | $-CH_2-C(CH_3)(CH_2CH_2-)-C(O)-NHCH_2-CH_2OH$ | Antistatic Agent. |
| | (5) $H_2N-(CH_2)_3-N(C_2H_5)(\text{-}3\text{-methyl-}4\text{-}(4\text{-nitrophenylazo})\text{phenyl})$ | $-CH_2-C(CH_3)(CH_2CH_2-)-C(O)-NH-(CH_2)_3-N(C_2H_5)\text{-aryl-}N=N\text{-aryl-}NO_2$ | Dye. |
| | (6) $H_2N$–C$_6$H$_4$–NH–C$_6$H$_5$<br>N-phenylphenylene diamine. | $-CH_2-C(CH_3)(CH_2CH_2-)-C(O)-NH-C_6H_4-NH-C_6H_5$ | Stabilizer. |
| | (7) 2-aminopyridine (pyridin-2-yl-NH–) | $-CH_2-C(CH_3)(CH_2CH_2-)-C(O)-NH\text{-(2-pyridyl)}$ | Ion Exchange Activity. |
| | (8) 4-amino-1-naphthalene Sulfonic Acid. | $-CH_2-C(CH_3)(CH_2CH_2-)-C(O)-N(H)\text{-naphthyl-}SO_3H$ | Antistatic Agent. |
| | (9) $H_2N$–C$_6$H$_4$–NH–C(O)–CH$_3$<br>N-aminoacetoanilide. | $-CH_2-C(CH_3)(CH_2CH_2-)-C(O)-NH-C_6H_4-NH-C(O)CH_3$ | |
| | (10) β-Aminoanthraquinone. | $-CH_2-C(CH_3)(CH_2CH_2-)-C(O)-NH\text{-anthraquinonyl(CH}_3)$ | |
| | (11) $H_2N$–C$_6$H$_4$–CN<br>p-Aminobenzonitrile. | $-CH_2-C(CH_3)(CH_2CH_2-)-C(O)-NH-C_6H_4-CN$ | |
| | (12) $H_2N-CH_2-CH_2-SO_3H$<br>Taurine. | $-CH_2-C(CH_3)(CH_2CH_2-)-C(O)-N(H)-CH_2-CH_2-SO_3H$ | Antistatic Agent. |
| –$NH_2$ Primary Amine, Amide. | (13) $H_2N-NH-C_6H_5$<br>Phenylhydrazine. | $-CH_2-C(CH_3)(CH_2CH_2-)-C(O)-NH-NH-C_6H_5$ | |

TABLE I—Continued

| Reactive Group | Compound | Polymeric Unit | Utility |
|---|---|---|---|
| | (14) $H_2N-\langle\bigcirc\rangle-NO_2$<br>p-Aminonitrobenzene. | structure with $-C(CH_2CH_2CH_3)(CH_2-)-C(O)-NH-\langle\bigcirc\rangle-NO_2$ | |
| | (15) 1,3 propanediol phosphoramide. | corresponding polymeric unit | Flame Retardant. |
| | (16) $H_2N-CH_2-CH_2-Si(OEt)_3$<br>Aminoethyl-triethoxysilane. | corresponding polymeric unit | Water Repellant. |
| | (17) Anthranilic Acid. | corresponding polymeric unit | Chelating Agent. |
| | (18) $H_2N-CH_2-CH_2-CN$<br>β-Aminopropionitrile. | corresponding polymeric unit | Antistatic Agent. |
| | (19) p-Aminophenyl coumarin. | corresponding polymeric unit | Optical Brightening Agent. |
| HN Secondary Amine, Amide, Imide. | (20) Piperidine. | corresponding polymeric unit | Plasticizer. |
| | (21) Diethanolamine. | corresponding polymeric unit | Antistatic Agent. |
| | (22) N-methyl piperazine. | corresponding polymeric unit | |
| | (23) Dibenzylamine. | corresponding polymeric unit | |

TABLE I—Continued

| Reactive Group | Compound | Polymeric Unit | Utility |
|---|---|---|---|
| Alcoholic Hydroxyl. | (24) HO(—CH₂CH₂O)₁₀—φ<br>Monophenyl ether of polyethylene oxide. | CH₃—C(CH₂)(CH₂CH₃)—C(=O)—O(CH₂—CH₂O)₁₀—φ | Antistatic Agent. |
| | (25) HO—CH₂—(CF₂—CF₂)₉CF₃<br>Tetrafluoroethylene telomer alcohol. | CH₃—C(CH₂)(CH₂CH₃)—C(=O)—O—CH₂—(CF₂—CF₂)₉CF₃ | Oil and Water Repellant. |
| | (26) HO—φ—C(NH—C—φ—OCH₃)=N—C—φ—OCH₃<br>1-hydroxyphenyl-3,4-p-methoxy-phenyl imidazole. | CH₃—C(CH₂)(CH₂CH₃)—C(=O)—O—φ—C(NH—C—φ—OCH₃)=N—C—φ—OCH₃ | Photochromic Additive. |
| | (27) HO—CH₂—CH₂—O—CH₂—CH₂—O—CH₃<br>Methyl ether of diethylene glycol. | CH₃—C(CH₂)(CH₂CH₃)—C(=O)—O—CH₂CH₂OCH₂CH₂OCH₃ | Antistatic Agent. |
| | (28) HO—CH₂—CH=CH₂<br>Allyl alcohol. | CH₃—C(CH₂)(CH₂CH₃)—C(=O)—OCH₂—CH=CH₂ | Double bond for further reaction. |
| | (29) HOCH₂—φ(t-butyl)(t-butyl)—OH<br>4-hydroxymethyl-2,6-di-t-butyl phenol. | CH₃—C(CH₂)(CH₂CH₃)—C(=O)—OCH₂—φ(t-butyl)(t-butyl)—OH | Antioxidant. |
| | (30) HOCH₂—(tetrahydrofuryl)<br>Tetrahydrofurfuryl alcohol. | CH₃—C(CH₂)(CH₂CH₃)—C(=O)—OCH₂—(tetrahydrofuryl) | |
| | (31) HO—φ—C(=O)H<br>p-Hydroxybenzaldehyde. | CH₃—C(CH₂)(CH₂CH₃)—C(=O)—O—φ—C(=O)H | |
| | (32) HO—φ(OH)—C(=O)—φ<br>2,4-dihydroxybenzophenone. | CH₃—C(CH₂)(CH₂CH₃)—C(=O)—O—φ(OH)—C(=O)—φ | Ultraviolet Screen. |
| | (33) HO—φ—O—C(=O)—φ<br>Resorcinol Monobenzoate. | CH₃—C(CH₂)(CH₂CH₃)—C(=O)—O—φ—O—C(=O)—φ | Precursor to Ultraviolet Screen. |

TABLE I—Continued

| Reactive Group | Compound | Polymeric Unit | Utility |
|---|---|---|---|
| Alcoholic Hydroxyl. | (34) HO—CH₂—CH₂—CN  Hydracrylonitrile. | CH₃—C(CH₂)(CH₂)—C(=O)—O—CH₂—CH₂—CN | Antistatic Agent. |
|  | (35) HO—C₆H₄—C(CH₃)₂—CH₃  p-t-Butyl phenol. | CH₃—C(CH₂)(CH₂)—C(=O)—O—C₆H₄—C(CH₃)₂—CH₃ | Precursor to Ultraviolet Screen. |
| Misc. Active Hydrogen +Sodium Derivatives. | (36) NaO—C₆Cl₄—Cl  (tetrachlorophenol sodium salt) | CH₃—C(CH₂)(CH₂)—C(=O)—O—C₆Cl₄—Cl | Flame Retardant. |
|  | (37) H₃C—CH(COOC₂H₅)₂ , NaCH(COOC₂H₅)₂  Diethyl malonate and sodium salt. | CH₃—C(CH₂)(CH₂)—C(=O)—O—CH(COOC₂H₅)—COOC₂H₅ |  |
|  | (38) NaO—C₆H₃(OH)—C(=O)—C₆H₅  Sodium salt of 2,4-dihydroxybenzophenone. | CH₃—C(CH₂)(CH₂)—C(=O)—O—C₆H₃(OH)—C(=O)—C₆H₅ | Ultraviolet Screen. |
|  | (39) NaS—C(=S)—N(CH₃)₂  Sodium salt of dimethyl dithiocarbamate. | CH₃—C(CH₂)(CH₂)—C(=O)—S—C(=S)—N(CH₃)₂ |  |
|  | (40) HS—C₇H₄NS (Mercaptobenzothiazole) | CH₃—C(CH₂)(CH₂)—C(=O)—S—C₇H₄NS |  |
|  | (41) HO—P(=O)(H)—C₆H₅  Benzene phosphinic Acid. | CH₃—C(CH₂)(CH₂)—C(=O)—O—P(=O)(H)—C₆H₅ | Flame Retardant. |
|  | (42) Na—N(CH₂CH₂)(C(=O)CH₂)  Sodium derivative of pyrrolidone. | CH₃—C(CH₂)(CH₂)—C(=O)—N(CH₂CH₂)(C(=O)CH₂) | Dye, Acceptor. |
|  | (43) H—S—C₆H₅  Benzenethiol. | CH₃—C(CH₂)(CH₂)—C(=O)—S—C₆H₅ | Stabilizer. |

TABLE I—Continued

| Reactive Group | Compound | Polymeric Unit | Utility |
|---|---|---|---|
| | (44) Sodium derivative of Ethyl Carbamate. 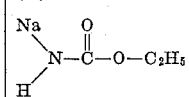 | 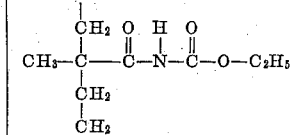 | |
| Misc. Active Hydrogen +Sodium Derivatives. | (45) Bis(methyl sulfon)imide Sodium derivative. 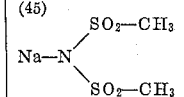 | 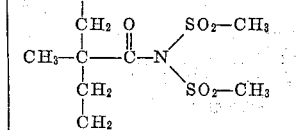 | |
| Aromatic Hydrogen +1 part of AlCl$_3$. | (46) 2,6-di-t-butylphenol. 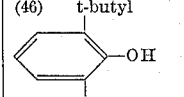 | 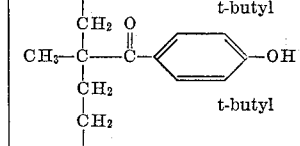 | Antioxidant. |
| | (47) 4-phenyl-2,6-di-t-butyl phenol. 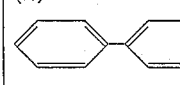 | 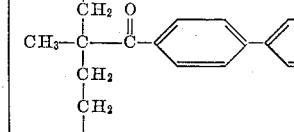 | Antioxidant. |
| | (48) Phenyl salicylate. 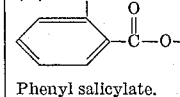 | 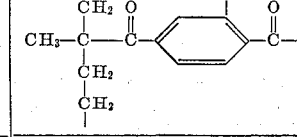 | Ultraviolet Screen. |
| | (49) Chlorobenzene. 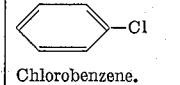 | 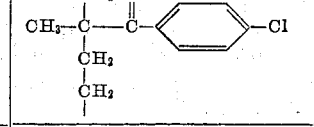 | Plasticizer. |
| | (50) Trimethyl ethylene. 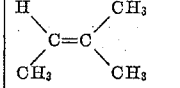 | 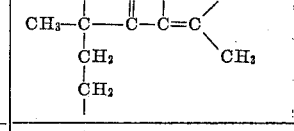 | |
| Grignard Reagents. | (51) CH$_3$MgCl Methyl magnesium chloride. | 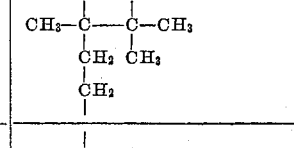 | |
| | (52) Naphthalene magnesium chloride. 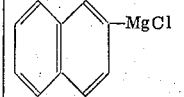 | 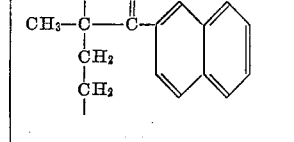 | |

The acyl halide copolymers are applied to the polymeric materials by coating techniques and/or impregnating procedures known in the art. A solution or a colloidal dispersion of the copolymer in an enert, preferably volatile, solvent may be sprayed, painted or exhausted onto the polymeric material, or the polymeric material may be dipped into a solution or colloidal dispersion of the copolymer. The thickness of the coating can be controlled by the concentration of the solution or dispersion, and in the case of dip coatings the contact time of the polymeric material with the coating material for the pickup of the solution depends in part on the absorptivity of the substrate. If desired, coatings of several mils thickness may be applied in this manner. The copolymer is preferably present in an inert solvent to the extent of between 0.01 and 50 parts per 100 parts by weight solvent. Specific suitable solvents include toluene, benzene, xylene, carbontetrachloride, and trichloroethylene.

After applying the solution or dispersion to the polymeric material, the solvent is removed and the copolymer and the polymeric material reacted or "cured". The reaction, as previously pointed out, results in the formation of ester or amide linkages between the copolymer and the polymeric material, as well as the formation of hydrogen halide, HX. In order to speed this reaction as well as the removal of the solvent, it is desirable to subject the compositions to elevated temperatures preferably within the range of 50° C. to 150° C. It is also preferable to carry out the reaction in an environment that allows the ready removal of the hydrogen halide formed. This environment may be provided by carrying out the curing reaction under partial vacuum or in an oven swept with an inert gas. The reaction will normally result in the conversion of about 10 to about 50% of the acyl halide radicals in copolymer to units having the formula

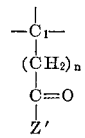

When the curing reaction is essentially complete, the product is then coated with a solution of the modifying compound. This coating may also be applied by coating techniques known in the art. The modifying compound is preferably dissolved in an inert solvent, hydrocarbon solvents are generally preferred, but polar solvents may also be employed. The concentration of the modifying compound in the solvent is not critical, for if the solution is dilute, larger amounts may be applied to achieve the desired result.

The reaction of the modifying compound and the previously copolymer coated polymeric material is preferably carried out at elevated temperatures to increase the speed of reaction and to remove the solvent. This speed of reaction may be effected by treating this coating in the same manner as the copolymer coating. The reaction of the modifying compound with the acyl halide units will usually result in conversion of about 10 to about 50% of them to units having the formula

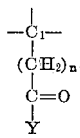

Since the linkage (1)

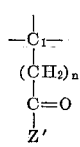

between the copolymer and the polymeric material, and the linkage (2)

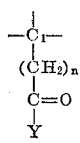

are both directly derived from the original (3)

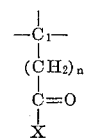

group in the copolymer, the total number of radicals having the Formulas 1, 2 and 3 is .1 to 25 mole percent of the total moles of units in the copolymer.

In the following examples which illustrate the invention, all parts and percentages are in parts by weight unless otherwise stated.

EXAMPLE I

Nylon cloth was immersed in a solution of 15 g. of ethylene methacrylyl chloride copolymer (84 parts by weight ethylene and 16 parts by weight methacrylyl chloride) in 600 ml. of toluene, squeezed and then cured for 45 minutes at 110° C. The cloth was then immersed in a 50%–50% Carbowax 400-toluene solution at 90° C. for 1 hour. (Carbowax 400 is a commercially available antistatic agent, known to be polyethylene glycol.) The cloth was then squeezed out and cured at 100° C. for 1 hour. Samples were then thoroughly washed in acetone and dried. The Carbowax was absorbed to the extent of about 1.5 to 1.8 weight percent. The cloth was again washed in tap water, and the weight pickup was reduced to 0.4 to 0.7%. Using an antistatic charging and discharging device, as described in J. Polymer Science, 33, 65 (1958), the rate of charge to 5000 volts and the time to discharge was measured. The cloth was again washed in water and retested. The results are shown in Table II, which also shows the results obtained using the same nylon cloth treated in the same manner but without the application of ethylene methacrylyl chloride coating.

TABLE II
[Charging and discharging rate of modified nylon cord]

| Cord | Time to Charge to 5,000 v., in minutes | Time to Discharge from 5,000 to 500 v. | Time to Discharge after washing |
|---|---|---|---|
| Unmodified Nylon | 22.5 | 20 | 20 |
| Treated Nylon | 1.9 | 1.4 | 0.15 |

EXAMPLE II

Samples of nylon cloth were treated with ethylene-methacrylyl chloride copolymer by padding the nylon with a 1% solution of the copolymer containing 16% by weight of methacrylyl chloride. Resin add-on was 0.47% based on weight of fabric. The treated nylon was then immersed for 3 hours at 50° C. in a 1% solution of deacetylated chitin, and amine substituted cellulose derivative, in 0.1 N aqueous hydrochloric acid to which had been aded 10% by volume of pyridine. The treated cloth was then removed from the solution, washed in 0.1 N HCl to remove excess deacetylated chitin and then washed thoroughly in running water. The cloth was readily dyed blue using "Pontamine" sky blue 6BX dye, known to be dianisidine coupled twice with Chicago acid, a dye used for cotton, whereas, a control sample of nylon treated only with copolymer did not dye.

The sample treated with the deacetylated chitin showed a lack of static build up when rubbed against a wool cloth whereas an untreated control, after rubbing with wool would cling tenaciously to the hand.

EXAMPLE III

Samples of wool serge were extracted with diethyl ether for 8 hours followed by extraction in ethyl alcohol for 8 hours and then air dried to remove any residual grease or finish. Wool samples were then padded with a 2% solution of ethylene methacrylyl chloride copolymer containing 18% by weight of methacrylyl chloride. Resin add-on after drying was 2.4%. Samples of the wool were then immersed in a 2% solution of a fluoroalkylamine (containing an average of 8 $CF_2$ groups/amine group) in dioxane containing 1 cc. of triethylamine/100 cc. of solution for 2 hrs. at 70° C. The samples were removed, air dried, and heated at 125° C. for about 30 minutes to remove the solvent. The samples were then extracted with acetone to remove the unreacted amine. Actual weight increase after acetone extraction was 0.70% on weight of fabric.

The oleophobic rating as defined by the oleophobic test (see below for details) for the samples was 7. The samples were then stirred for 20 minutes in a solution of 150 ml. percholorethylene containing 2.25 g. "Streets" 886 dry cleaning detergent (a commercially available sulfonated mahogany oil) and 0.15 g. water. After stirring the samples were drained, blotted and air dried followed by pressing in an electrically heated press at 150° C. for 15 seconds. Oleophobic rating for sample was 7. This procedure was repeated twice and the oleophobic rating after a total of 3 simulated dry cleanings was 6. Fluorine analysis of the sample after dry cleaning was 0.78% fluorine based on weight of fabric.

*Oleophobic test*

This is a test for determining the resistance of textiles to wetting by organic liquids. Drops of fluid hydrocarbons of varying surface tension are placed without impact on the fabric and the extent of wetting is determined visually. The hydrocarbons and their oleophobic rating number is shown below.

| Hydrocarbon: | Oleophobic rating number |
|---|---|
| n-Heptane | 9 |
| n-Octane | 8 |
| n-Decane | 7 |
| n-Dodecane | 6 |
| n-Tetradecane | 5 |
| 50 ml. "Nujol," 50 ml. n-Hexadecane | 4 |
| 75 ml. "Nujol," 75 ml. n-Hexadecane | 3 |
| "Nujol" | 2 |

"Nujol" is the Plough, Inc., trade-mark for a commercially available refined mineral oil.

At least two drops of a hydrocarbon is placed carefully on the fabric without impact. Within 10 seconds determine whether wetting of the fabric has occurred. Wetting is determined by the absence of light reflectance at the fabric-drop interface. If wetting occurs, repeat the test with the hydrocarbon with the next lower rating until a hydrocarbon is found which does not wet the fabric surface. Assign a rating corresponding to the hydrocarbon with the highest rating that does not wet the fabric.

EXAMPLE IV

Samples of blue wool serge were padded with a 2% solution in perchloroethylene of an ethylene-vinyl acetate-methacrylyl chloride terpolymer containing 23% of vinyl acetate and 8% by weight of methacrylyl chloride. After padding wool was dried at room temperature. Resin add-on was 1.9% based on weight of fabric. Pieces of the above treated wool were then immersed in a 2% solution of a fluoroalkylamine (containing an average of 8 $CF_2$ groups/amine group) in "diglyme" (diethylene glycol dimethyl ether) at 80° C. for 2 hours. Samples were then padded, air dried, and cured at 125° C./30 minutes. The samples were then extracted in acetone to remove excess fluoroalkylamine and dried. After drying, samples were heated to 175° C. for 10 minutes.

The oleophobic rating as described in Example III for these samples was 7. After 3 standard dry cleanings, the oleophobic rating had dropped to 6. Analysis of samples indicated 0.2% fluorine on the wool before and after dry cleaning.

EXAMPLE V

Samples of scoured cotton poplin were padded with a 2% solution of ethylene methacrylyl chloride copolymer containing 18% methacrylyl chloride in percholorethylene. The samples were then dried at room temperature under vacuum. The resin add-on was 1.3% based on weight of fabric. They were then immersed in a 2% solution of perfluoroalkyl amine in methyl ethyl ketone for 2 hours at 70° C. Samples were removed, padded and heated on a vacuum oven at 125° for ½ hour. The samples had picked up 0.3% of the fluoroalkylamine based on the weight of the fabric. They were then extracted with acetone to remove any unreacted fluoroalkylmine. Samples had an oleophobic rating (as described in Example III) of 4.

EXAMPLE VI

"Dacron taffeta (a fabric of polyester fibers made of dimethyl terephthalate and ethylene glycol) was padded with 1% solution of an ethylene methacrylyl chloride copolymer containing 8.4% methacrylyl chloride in perchloroethylene and then air dried to remove solvent. The amount of resin pick up was 0.29% on weight of fabric. Sample was then immersed and padded in a 10% solution of a nitrile silicone which had 41% of the nitrile groups reduced to amines. Samples were placed in an oven at 120° for 72 hours. After removal, samples were washed twice in acetone to remove unreacted silicone.

The sample was tested for antistatic activity by measuring charge decay on a charge decay apparatus. This apparatus is described in J. Polymer Science, 33, 65 (1958). Following table illustrates:

| Sample: | Time to discharge from 5000 v. to 2500 v., seconds |
|---|---|
| Cotton | 60–90 |
| "Dacron" control | »$10^3$ |
| "Dacron" treated | 15 |
| "Dacron" treated after 8 washes with a commercial sodium alkyl sulfonate detergent | 54 |
| "Dacron" treated after 3 dry cleanings (commercial dry cleaners) | 36 |

EXAMPLE VII

Samples of cotton broadcloth, twill, and poplin were padded with a 2% by weight solution of an ethylene-methacrylyl chloride copolymer containing 6% by weight of methacrylyl chloride in perchloroethylene. The samples contained about 2% of copolymer (based on weight of fabric). After air drying the samples were immersed at 60–70° C. in a 10% by weight solution of polyglycolamine having the formula $H(OCH_2CH_2)_nNH_2$ of a molecular weight of about 500, in methyl ethyl ketone. Samples were then padded and cured at 125° for ½ hour and then rinsed in acetone to remove excess polyglycolamine.

These samples were then soiled using a standard Sanders-Lambert type dry soil by tumbling for 5 minutes with 10% of their weight of soil. After removing the loose dirt with a vacuum cleaner, they were washed in an automatic washer for 12 minutes. Reflectance measurements made before and after the soiling and washing are shown below.

| Sample | Reflectance* | | Percent Recovery $R_w/R_{orig.}$ |
|---|---|---|---|
| | Before $R_{orig.}$ Soiling | After $R_w$ Washing | |
| Broadcloth+E/MACl | 84.5 | 71.5 | 84.5 |
| Broadcloth+E/MACl+polyglycolamine | 83.4 | 75.5 | 91 |
| Poplin+E/MACl | 86.1 | 71.1 | 82.5 |
| Poplin+E/MACl+polyglycolamine | 83.9 | 74.3 | 88.7 |
| Twill+E/MACl | 88.0 | 69.6 | 79 |
| Twill+E/MACl+polyglycolamine | 85.2 | 72.9 | 85.6 |

*Reflectance measured on a Hunter color and Color-Difference Meter Model D-25.

These results show the improvement in soiling resistance tendency of the samples treated with ethylene-methacrylyl chloride copolymer to which a polyglycolamine was appended over the ones merely treated with ethylene-methacrylyl chloride copolymer alone.

EXAMPLE VIII

Samples of "Dacron" polyester taffeta fabric were padded with a 2% solution of an ethylene-methacrylyl chloride copolymer containing 18% methacrylyl chloride in perchloroethylene. After padding the samples were air dried at room temperature. Resin add-on was approximately .50% based on weight of fabric.

The above samples were then immersed in a 3% solution of p-aminophenol in dioxane at 70° C. for 2 hours. After immersion, the samples were removed, padded, and dried at 125° for ½ hour. After drying, the samples were rinsed in acetone to remove the excess aminophenol. A pilot film of ethylene methacrylyl chloride immersed in the same p-aminophenol solution was converted to the corresponding amide as shown by infrared examination of the film and indicated that the conditions were sufficient for attaching the p-aminophenol to the ethylene methacrylyl chloride coating.

EXAMPLE IX

Samples of "Dacron" polyester taffeta fabric were padded with a 2% solution of an ethylene-methacrylyl chloride copolymer containing 18% methacrylyl chloride in perchloroethylene. After padding, the samples were air dried at room temperature. The resin add-on was approximately 0.5% based on weight of fabric.

The samples were then immersed in a 3% solution of p-aminophenyl coumarin in dioxane at 70° C. for 2 hours. They were then removed, padded, and dried at 125° C. for ½ hour. After drying, the samples were rinsed in acetone to remove excess p-aminophenyl coumarin.

The samples, when viewed under a UV lamp, showed a bright fluorescence as compared to none for a control sample indicating the p-phenyl coumarin has been attached to the "Dacron" via the ethylene methacrylyl chloride copolymer.

EXAMPLE X

Samples of nylon taffeta were padded with a 2% solution of ethylene-methacrylyl chloride copolymer containing 18% methacrylyl chloride in perchloroethylene. The samples were dried at room temperature and the resin add-on was 0.5%. The samples of treated nylon were then immersed in a 2% solution of 2(o-aminophenyl)-benzothiazole in dioxane for 2 hours at 70° C. The samples were then removed, padded, air dried, and then cured in a vacuum oven at 125° C. for ½ hour. They were then rinsed in acetone to remove the excess 2(o-aminophenyl)benzothiazole. A thin film of ethylene-methacrylyl chloride copolymer immersed in the same dioxane solution was examined by infra-red and was shown that about 50% of the acid chloride groups to have been converted to amide of the benzotriazole and indicates conditions adequate for reaction of the ethylene methacrylyl chloride coating with the amine.

EXAMPLE XI

A piece of blue serge wool was padded with a 2% solution of ethylene methacrylyl chloride copolymer (85 parts by weight ethylene and 15 parts by weight methacrylyl chloride) in benzene. The material was then air dried at 120° C. for 30 minutes, and then immersed in a dioxane solution of perfluoroalkyl-substituted primary amine compounds prepared as follows:

1556 parts (3 molar parts) of a mixture of 1-iodoperfluoro-alkanes containing $C_6F_{13}I$, $C_8F_{17}I$, and $C_{10}F_{21}I$ (average molecular weight, 519) was condensed with 171.3 parts of allylamine (3 molar parts) by heating at 53 to 70° C. for 6½ hours in the presence of alpha,alpha'-azobisisobutyronitrile catalyst (6 parts). The liquid reaction product was stripped essentially free of unreacted allylamine and iodoperfluoroalkanes, leaving a residue of 1213 parts of fluoroalkylamines and hydroiodide salts thereof.

The fluorinated alkylamine was present in the solution to the extent of about 6% by weight of the solution. The product was heated in an air oven at 120° C. for 30 minutes, and then washed in acetone to extract any unreacted fluoroalkylamine. The product when tested by the method described in Example III had an oleophobic rating of 6 and a water spray rating of 90 when measured by AATCC Test method 22–1952. The product was then dry cleaned three times and the oleophobic rating was 4 and the water spray rating was 50.

EXAMPLE XII

A vinylidene chloride-acrylonitrile-itaconic acid terpolymer containing 90 parts vinylidene chloride, 9 parts acrylonitrile and 3 parts itaconic acid was converted to the corresponding vinylidene chloride-acrylonitrile-itaconoyl chloride according to the procedure described in United States patent application Serial No. 254,567. Five grams of the converted terpolymer were dissolved in 200 ml. of a solution containing 65 parts by weight of tetrahydrofuran and 35 parts by weight of toluene. Wool serge cloth was immersed in the above solution for 30 minutes and then squeezed through rolls to remove excess solution. The treated cloth was air dried at room temperature to remove solvent. Resin add-on was 2% based on the weight of the fabric. The treated cloth was then immersed in 2% by weight dioxane solution of the fluorinated alkylamine described in Example XI. The samples were removed, air dried, and heated at 125° C. for 30 minutes to remove solvent and then rinsed in acetone to remove unreacted fluorinated alkylamine. The product was then tested for oleophobic rating as described in Example III and had a rating of 6. After three simulated dry-cleanings as described in Example III, the oleophobic rating was 4.

EXAMPLE XIII

A vinylidene chloride-methacrylic acid copolymer containing 90 parts of vinyl chloride and 10 parts of methacrylic acid was converted to the corresponding vinyl chloride-methacrylyl chloride copolymer according to the procedure described in United States patent application Serial No. 254,567. Five grams of the above copolymer were dissolved in 200 ml. of a solution containing 65 parts by weight of tetrahydrofuran and 35 parts by weight of toluene. Nylon taffeta fabric was immersed in the above solution and passed through squeeze rolls to remove excess solution. The fabric samples were dried at room temperature and the resin add-on was 0.5% based on the weight of the fabric. The samples were then immersed in a 10% by weight solution of a polyglycolamine having the general formula $$H(OCH_2CH_2)_nNH_2$$

and an average molecular weight of 500 in methyl ethyl ketone. The samples were padded and cured at 125° C. for 30 minutes and then rinsed in acetone to remove the excess polyglycolamine. The treated sample showed no tendency to cling to the hand when rubbed with a piece of wool cloth, whereas an untreated control exhibited a severe tendency to cling to the hand when rubbed with a wool cloth.

In most instances, the polymeric material will comprise the bulk of the product produced by this invention. The weight of the copolymer will usually be about .25 to 3% of the weight of the polymeric material, and the weight modifying compound will usually be between 10 and 300% of the weight of the copolymer.

The products of this invention may also be obtained by forming a solution of the copolymer in a solvent, adding the modifying compound to the solution, and reacting the modifying compound with the acyl halide radical by mild heating and then applying the solution to the polymeric material by conventional coating methods, and then mildly heating to react acyl halide radicals with the polymeric material.

I claim:

1. A composite article comprising a polymeric material having at least one Z radical where Z is selected from the class consisting of

and a copolymer having at least 50 mol percent units of the formula

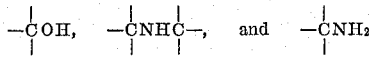

where R' is a radical selected from the class consisting of hydrogen, halogen and hydrocarbon radicals having 1 to 8 carbon atoms and $R_2$ is a radical selected from the class consisting of hydrogen, halide, and methyl, and acyl halide units having 3 to 8 carbon atoms, said units including the radical (1)
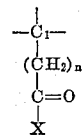

where $C_1$ is a carbon atom in the main polymer chain, $n$ is 0 to 5 and X is halogen, said copolymer being bonded to the polymeric material through radicals having the formula (2)
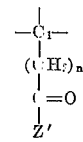

where $C_1$ is a carbon atom in the main polymer chain, $n$ is 0 to 5, and Z' is a radical in the polymeric material and is covalently bonded through an atom selected from the class consisting of nitrogen and oxygen to the carbon atom of the copolymer, said copolymer also having radicals having the formula (3)
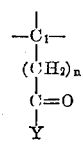

where $C_1$ is a carbon atom in the main polymer chain, $n$ is 0 to 5, and Y is an organic radical, the sum of the number of radicals 1, 2, and 3 being .1 to 25 mole percent of the total number of units in the copolymer.

2. The composite article of claim 1 in which the units having the formula

are derived from ethylene and the acyl halide units are methacrylyl halide units.

3. The composite article of claim 1 in which the Y radical is derived from a compound containing at least one radical selected from the class consisting of aromatic hydrogen, alcoholic hydroxyl, primary amine, unsubstituted amido, secondary amino, N-alkyl substituted amido, imino, enolizable carbon hydrogen, mercapto, thiocarboxylic acid, and phosphino.

References Cited by the Examiner

UNITED STATES PATENTS

| | | | |
|---|---|---|---|
| 2,440,090 | 4/1948 | Howk et al. | 260—64 |
| 2,646,425 | 7/1953 | Barry | 260—94.9 |
| 2,671,074 | 3/1953 | Brown | 260—80.7 |
| 2,780,608 | 2/1957 | Hurwitz et al. | 260—29.6 |
| 2,789,030 | 4/1957 | Fetscher | 8—120 |
| 3,021,269 | 2/1962 | Miller | 204—154 |
| 3,042,642 | 7/1962 | De Marco et al. | 260—29.6 |
| 3,083,118 | 3/1963 | Bridgeford | 117—47 |
| 3,093,441 | 6/1963 | Whitfield et al. | 8—128 |
| 3,107,969 | 10/1963 | Koenig | 8—128 |

FOREIGN PATENTS 213,942   3/1958   Australia.

OTHER REFERENCES

Hall et al.: J. Appl. Pol. Sci., 2 (1959).
Textile World, 2, 86–90 (1962).

MURRAY KATZ, *Primary Examiner.*

W. D. HERRICK, *Assistant Examiner.*